United States Patent
Benmimoun et al.

(10) Patent No.: US 10,150,472 B2
(45) Date of Patent: Dec. 11, 2018

(54) METHOD FOR AUTOMATICALLY ASSESSING A RISK OF COLLISION BETWEEN A VEHICLE AND AN OBJECT

(71) Applicant: FORD GLOBAL TECHNOLOGIES, LLC, Dearborn, MI (US)

(72) Inventors: Ahmed Benmimoun, Aachen NRW (DE); Jitendra Shah, Kolkota (IN); Jiezhi Fan, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 14/554,437

(22) Filed: Nov. 26, 2014

(65) Prior Publication Data

US 2015/0151748 A1 Jun. 4, 2015

(30) Foreign Application Priority Data

Nov. 29, 2013 (DE) .................. 10 2013 224 508

(51) Int. Cl.
*B60W 30/09* (2012.01)
*B60W 50/14* (2012.01)
(Continued)

(52) U.S. Cl.
CPC .......... *B60W 30/09* (2013.01); *B60W 10/184* (2013.01); *B60W 10/20* (2013.01);
(Continued)

(58) Field of Classification Search
CPC .................. B60T 8/17558; B60T 2260/02
See application file for complete search history.

(56) References Cited

U.S. PATENT DOCUMENTS

| 6,653,935 B1 | 11/2003 | Winner et al. |
| 8,423,250 B2 | 4/2013 | Kondou et al. |

(Continued)

FOREIGN PATENT DOCUMENTS

| DE | 102005046841 A1 | 4/2007 |
| DE | 102009006747 A1 | 8/2010 |

(Continued)

OTHER PUBLICATIONS

Chinese Office Action for Chinese Application No. 201410709191.9 dated May 30, 2018.

*Primary Examiner* — Michael D Lang
(74) *Attorney, Agent, or Firm* — Brooks Kushman P.C.; Frank MacKenzie

(57) ABSTRACT

A method for automatically assessing the risk of collision between a vehicle and an object includes determining a danger value characteristic of the risk of collision on the basis of the relative position and the relative speed between the vehicle and the object. A braking danger value is determined based on the current distance between the vehicle and a last possible ("last-chance") position at which it is possible to avoid a collision between the vehicle and the object by braking the vehicle, and a steering danger value is determined based on the current distance between the vehicle and a last possible ("last-chance") position at which it is possible to avoid a collision between the vehicle and the object by steering the vehicle. The risk of collision is assessed on the basis of the braking danger value and the second danger value.

10 Claims, 4 Drawing Sheets

(51) Int. Cl.
  *B60W 10/184* (2012.01)
  *B60W 10/20* (2006.01)
  *B60W 30/095* (2012.01)
  *B60W 50/00* (2006.01)

(52) U.S. Cl.
  CPC .......... *B60W 30/095* (2013.01); *B60W 50/14* (2013.01); *B60W 2050/0094* (2013.01); *B60W 2520/10* (2013.01); *B60W 2550/10* (2013.01)

(56) References Cited

U.S. PATENT DOCUMENTS

| | | |
|---|---|---|
| 8,437,890 B2 | 5/2013 | Anderson et al. |
| 2005/0090955 A1 | 4/2005 | Engelman et al. |
| 2008/0046145 A1* | 2/2008 | Weaver ................. B60T 7/22 701/41 |
| 2011/0178710 A1 | 7/2011 | Pilutti et al. |
| 2013/0054128 A1* | 2/2013 | Moshchuk et al. ........... 701/301 |

FOREIGN PATENT DOCUMENTS

| | | | |
|---|---|---|---|
| EP | 1873737 A1 | 1/2008 | |
| KR | 10-2008-0064798 | * 7/2008 | .............. B60Q 5/00 |

* cited by examiner

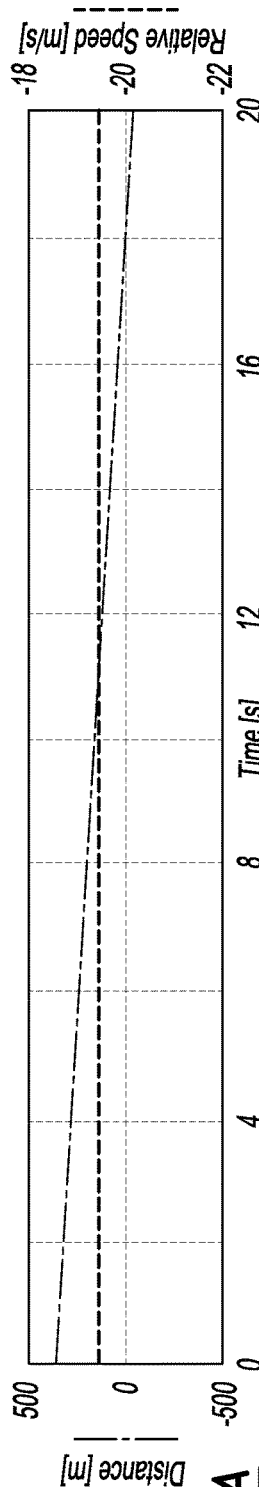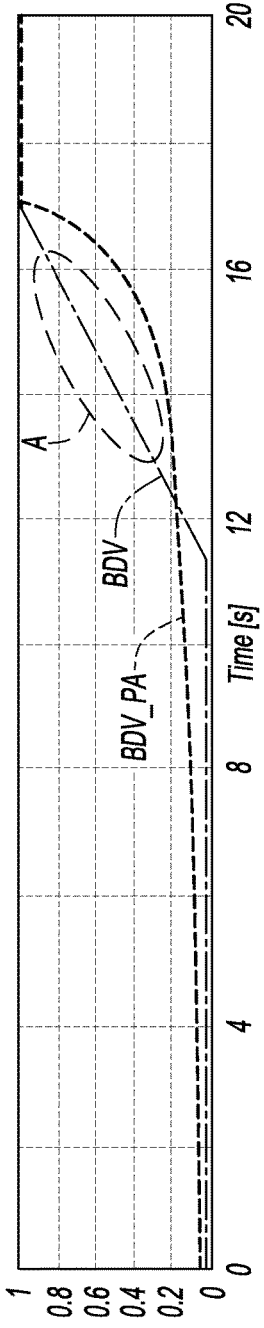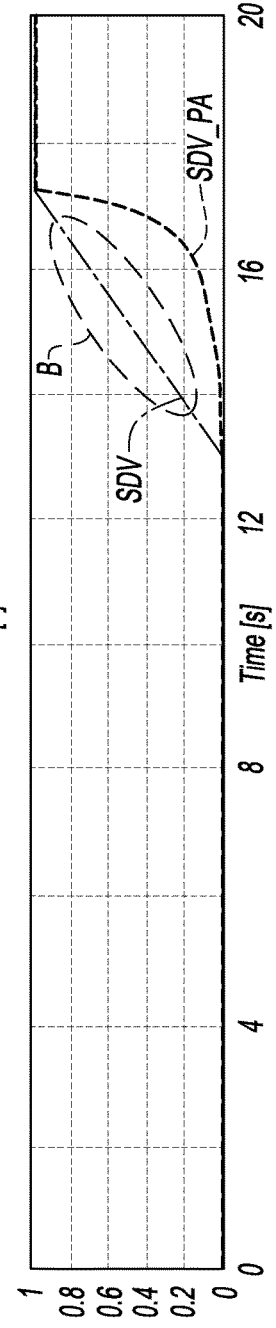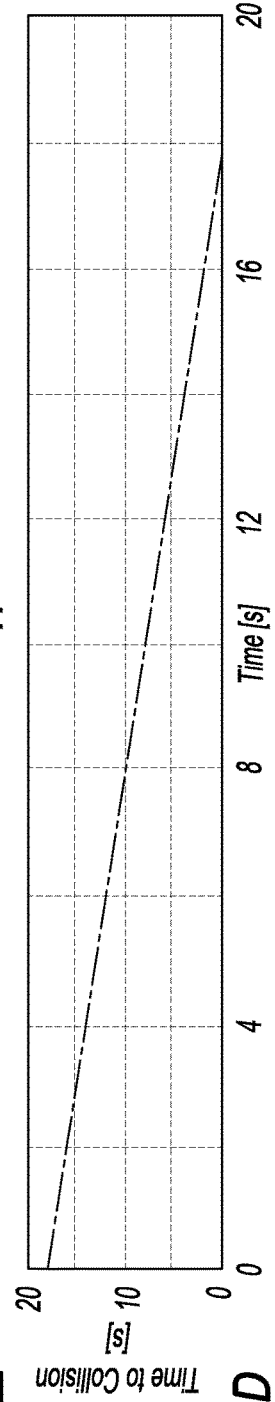
Fig-4A
Fig-4B
Fig-4C
Fig-4D

METHOD FOR AUTOMATICALLY ASSESSING A RISK OF COLLISION BETWEEN A VEHICLE AND AN OBJECT

CROSS-REFERENCE TO RELATED APPLICATIONS

This application claims foreign priority benefits under 35 U.S.C. § 119(a)-(d) to DE 10 2013 224 508.4 filed Nov. 29, 2013, which is hereby incorporated by reference in its entirety

TECHNICAL FIELD

The invention relates to a method and an apparatus for automatically assessing the risk of collision between a vehicle and an object.

BACKGROUND

Current vehicle safety systems are often designed to continuously monitor the environment of a vehicle and to report on objects which are detected by said systems in the environment of the vehicle. In this case, such objects are usually described in terms of their kinematic state (for example position and speed).

In order to assist the driver, it is necessary in this case to distinguish between critical situations and normal or non-critical situations. In order to be able to assess the collision danger posed by an object in the environment of the vehicle, it is necessary to quantify this danger, in which case a quantitative value determined in this case is referred to as a degree of danger, for example. Different approaches are known for the purpose of determining this degree of danger. With respect to the prior art, reference is made only by way of example to US 2005/0090955A1, DE 10 2009 006 747 A1, EP 1 873 737 B1, DE 199 54 536 B4, DE 10 2005 046 841 A1, US 2011/0178710 A1 and U.S. Pat. No. 8,437,890 B2.

A problem which arises when quantifying the collision danger posed by an object in the environment of a vehicle by means of a degree of danger is that it may be difficult to define a suitable threshold value for the degree of danger, upon the exceeding of which a warning signal and/or active intervention by the safety system must be effected. In extreme cases for example, the degree of danger may still remain at a low value for a relatively long period of time while approaching an object or obstacle and may only increase to a significant value immediately before the collision, in which case it may then already be too late to assist the driver and/or activate a collision warning system or avoid or mitigate a collision.

SUMMARY

Against the above background, an object of the present invention is to provide a method and an apparatus for automatically assessing the risk of collision between a vehicle and an object, which method and apparatus enable more effective collision protection.

A method disclosed herein for automatically assessing the risk of collision between a vehicle and an object in the environment of the vehicle, this assessment comprising automatically determining at least one danger value characteristic of the risk of collision at least on the basis of the relative position and the relative speed between the vehicle and the object, has the following steps of:

determining a last-chance braking-avoidance position in which it is possible to avoid a collision between the vehicle and the object by braking the vehicle;
determining a braking danger value on the basis of the current distance between the vehicle and this last-chance braking-avoidance position;
determining a last-chance steering-avoidance position in which it is possible to avoid a collision between the vehicle and the object by steering the vehicle;
determining a steering danger value on the basis of the current distance between the vehicle and this last-chance steering-avoidance position; and
assessing the risk of collision on the basis of the first danger value and the second danger value.

The disclosed method is based on the concept of quantifying the risk of collision from an object in the environment of a vehicle in such a manner that, on the basis of this quantification, it is possible to provide a particularly reliable prediction of when a suitable measure (for example output of a warning signal and/or active intervention in the control of the vehicle by steering and/or braking the vehicle) should be carried out in view of the danger assessment, in particular if particular threshold values are exceeded by the characteristic values ("danger values") used to quantify the danger.

In order to achieve this better predictability of the risk of collision, the danger is assessed in such a manner that the degree of danger used to quantify the danger (as expressed in the braking danger value and/or the steering danger value) has a linear time dependence. Implementing such a linear time dependence of the degree of danger makes it possible to avoid, in particular, the unfavorable scenarios described above in which the degree of danger changes relatively slowly for a relatively long period as the vehicle approaches an object and increases significantly rapidly only shortly before the collision which can then no longer be avoided. Rather, on the basis of the linear temporal profile of the degree of danger determined or used, it is possible to reliably predict when particular threshold values can be expected to be exceeded and it is imperative to initiate suitable measures for avoiding or mitigating a collision.

Another advantage of the linear time dependence of the degree of danger used in the disclosed method is that the gradient of the corresponding signal profile for said degree of danger is approximately more shallow than an exponential or hyperbolic time dependence, with the result that the sensitivity to background noise in the sensor signal (for example from radar or camera sensors) is also reduced.

When quantifying the risk of collision in accordance with the disclosed embodiments, the fact that a vehicle carrying out the method according to the invention can avoid an imminent collision by means of braking and/or by means of steering is taken into account. On the basis of this consideration, both a point or position at which there is a last possibility ("last-chance") to avoid a collision by means of braking (corresponding to longitudinal collision avoidance) and a point or position at which there is a last possibility ("last-chance") to avoid a collision by means of steering (corresponding to lateral collision avoidance) are determined according to the invention.

The danger assessment according to the invention can be carried out with respect to other vehicles which approach the relevant vehicle carrying out the method according to the invention from the front, from the rear or else from the side. However, the invention is not restricted to collision avoidance with respect to objects in the form of other vehicles, but rather can also be used to avoid collisions with other objects, for example road signs, road boundaries, pedestrians etc.

In order to determine a suitable degree of danger (in particular the degree of danger implementing the temporally linear profile described above), that position (or its distance from the object posing the danger of collision) from which it is no longer possible to physically avoid a collision between the vehicle and the object by means of braking or steering is preferably determined and the current distance between the vehicle and this last-chance position is determined. According to the invention, a braking danger value (BDV), which is based on collision avoidance by means of braking, and a steering danger value (SDV), which is based on collision avoidance by means of steering, are each calculated from the values determined in this manner, namely the respective distance between the vehicle and the object in the relevant last-chance braking-avoidance or last-chance steering-avoidance position, on the one hand, and the respective current distance between the vehicle and this last-chance braking-avoidance or steering-avoidance position, on the other hand.

The invention also relates to an apparatus for automatically assessing the risk of collision between a vehicle and an object, the apparatus having a first sensor arrangement for detecting the kinematic state of the object, a second sensor arrangement for determining the kinematic state of the vehicle, and a controller for assessing the risk of collision by automatically determining at least one danger value characteristic of the risk of collision at least on the basis of the relative position and the relative speed between the vehicle and the object, the controller being configured to carry out the following steps:

determining a first danger value on the basis of the current distance between the vehicle and a last-chance braking-avoidance position in which it is possible to avoid a collision between the vehicle and the object by braking the vehicle;

determining a second danger value on the basis of the current distance between the vehicle and a last-chance steering-avoidance position in which it is possible to avoid a collision between the vehicle and the object by steering the vehicle; and assessing the risk of collision on the basis of the first danger value and the second danger value.

With respect to advantages and preferred refinements of the apparatus, reference is made to the above statements in connection with the method according to the invention.

Further refinements of the invention are disclosed in the description and the dependent claims.

The invention is explained in more detail below using a preferred embodiment with reference to the accompanying Figures, in which:

BRIEF DESCRIPTION OF THE DRAWINGS

FIGS. 4A-D show graphs for explaining the advantages achieved by the invention in comparison with a known method.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
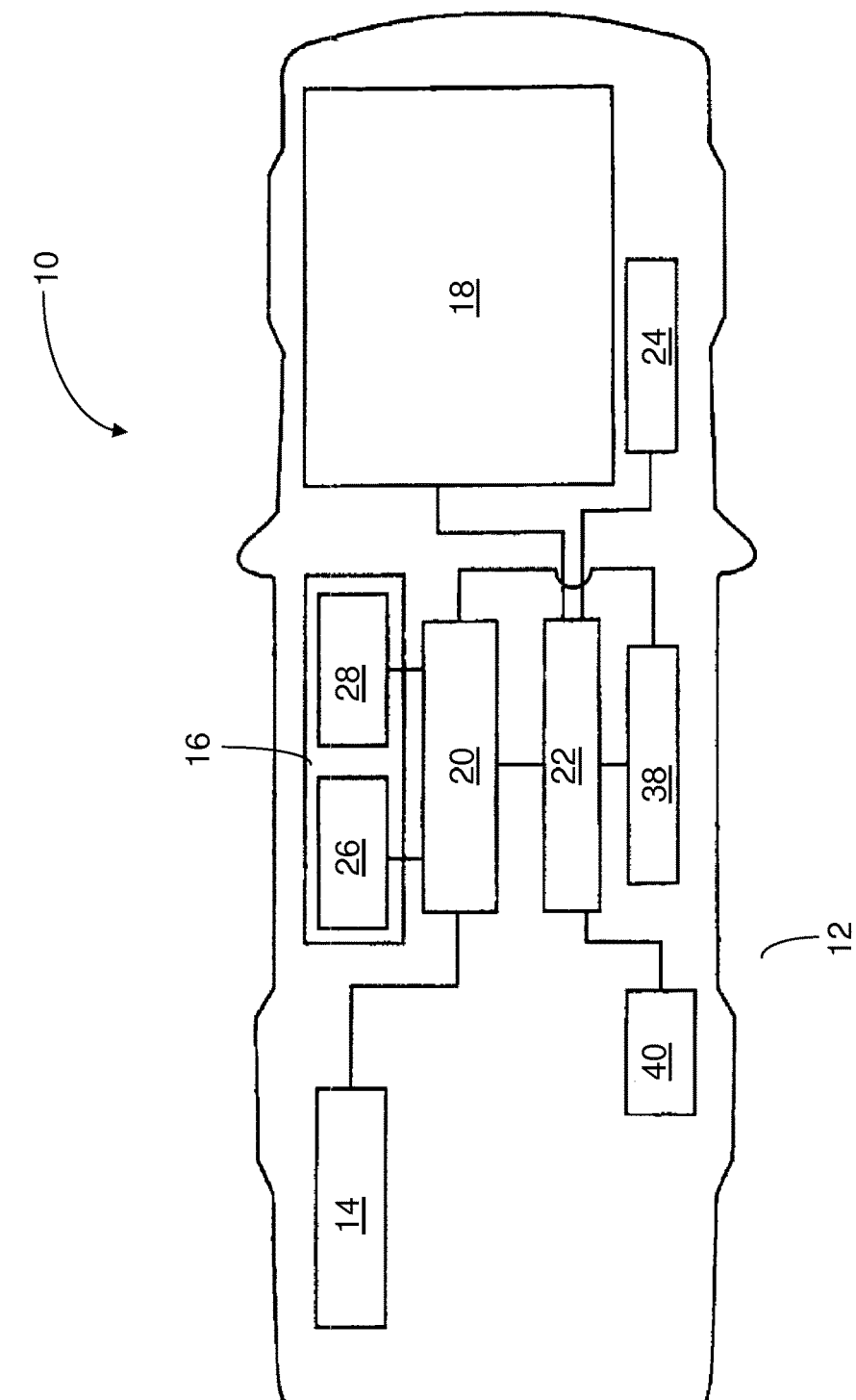
FIG. 1 shows a schematic diagram for explaining the possible structure of an apparatus according to the invention.

FIG. 1 shows a schematic diagram for explaining an example of a possible fundamental structure of an apparatus 10 suitable for carrying out the method according to the invention in a vehicle 12. Said apparatus has a sensor arrangement 16 with a yaw rate sensor 26 and a speed sensor 28 for determining the vehicle kinematics and remote sensors 14 for detecting the kinematics of objects in a vicinity of the vehicle 12. "20" is used to denote a danger assessment controller, the function of which controller involves determining a braking danger value (BDV) and a steering danger value (SDV) in the manner described below with reference to FIG. 2 ff. for the purpose of quantifying the risk of collision and determining an existing degree of danger.

As also explained below, in the case of the braking danger value (BDV), collision avoidance by braking the vehicle is assumed, whereas, in the case of the steering danger value (SDV), collision avoidance by steering the vehicle is assumed. A main controller 22 connected to the danger assessment controller 20 can be used to determine whether the driver of the vehicle is to be warned of an imminent collision via a display 24 or whether a suitable countermeasure is to be automatically initiated in view of the danger assessment, for example by means of a braking or steering intervention (unit 18). Furthermore, in FIG. 1, 38 is used to denote a central memory assigned to the danger assessment controller 20 for and to the main controller 22 and "40" is used to denote a driver input unit connected to the main controller 22.

An exemplary sequence of a method according to features of the invention is described below with reference to the illustrated flowchart of FIG. 2.

In steps S10 and S20, the vehicle kinematics (with, for example, the aid of the sensor arrangement 16, that is to say the yaw rate sensor 26 and the speed sensor 28 from FIG. 1) and the kinematics of an object near the vehicle 12 (with the aid of the sensors 14 for detecting objects from FIG. 1) are first of all determined. The vehicle and object kinematics are each determined in a manner fundamentally known to a person skilled in the art, for example from US 2005/0090955 A1.

Figure 2:
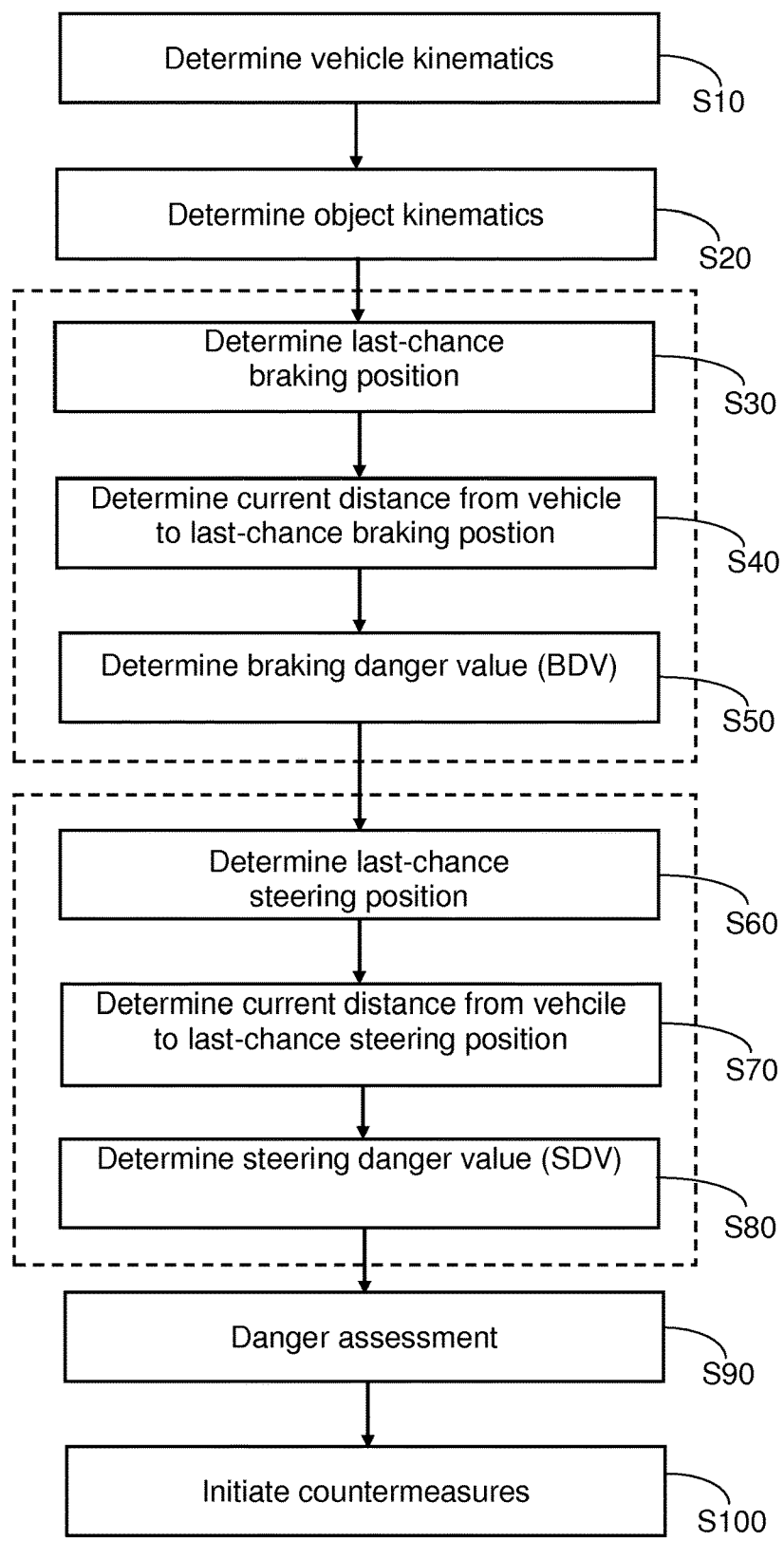
FIG. 2 shows a flowchart for explaining a disclosed method for assessing danger.

Steps S30 to S50 in the flowchart from FIG. 2 are each used to determine a braking danger value (BDV), whereas steps S60 to S80 are used to determine a steering danger value (SDV). These values BDV and SDV are determined according for the purpose of quantifying the existing risk of collision, in which case the BDV value is based on the possibility of avoiding a collision by braking the vehicle and the SDV value is based on the possibility of avoiding a collision by means of steering.

As far as the determination of the BDV value is initially concerned, the point or position of the vehicle at which the possibility of avoiding a collision by means of braking last exists, that is to say the last-chance braking-avoidance position, is determined in step S30. Based on this last-chance braking position and the current distance between the vehicle and this position, as determined in step S40, the BDV value is determined in step S50.

In a similar manner, that point or position of the vehicle at which the possibility of avoiding a collision by steering the vehicle last exists, that is to say the last-chance steering-avoidance position, is determined in step S60. Based on this last-chance steering position and the current distance between the vehicle and this position, as determined in step S70, the SDV value is determined in step S80.

Based on the BDV value and SDV value obtained in this manner, a danger is then assessed in step S90 to the effect that it is determined or predicted when the relevant BDV value or SDV value exceeds a respectively predefined threshold value, in which case one or more suitable countermeasures (for example generation of a warning signal, active steering or braking intervention) are initiated in step S100.

Figure 3:
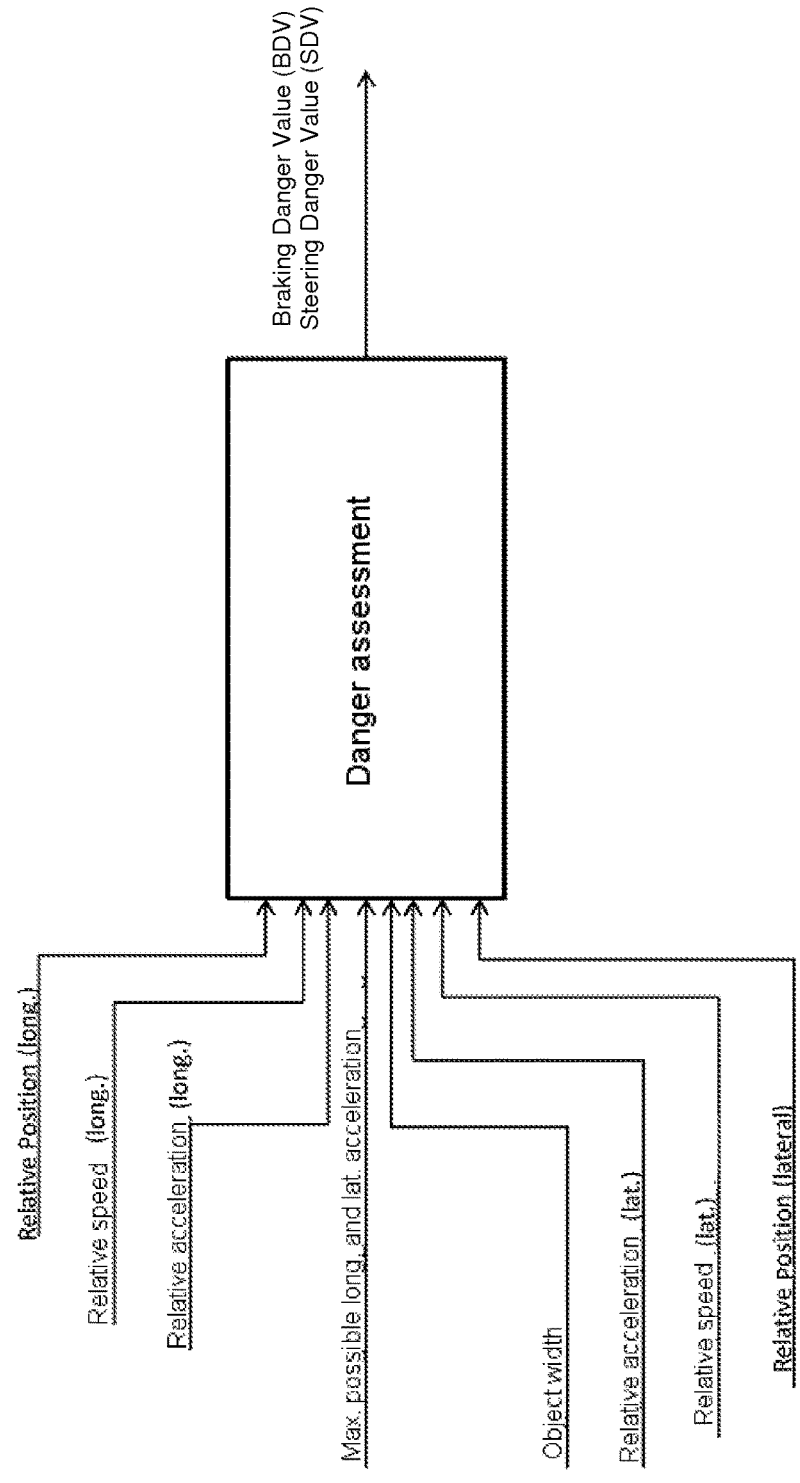
FIG. 3 shows a schematic diagram for explaining the assessment of danger carried out according to a disclosed embodiment on the basis of a braking danger value and a steering danger value.

Overall, as schematically illustrated in FIG. 3, a danger is assessed according to the present invention taking into account the kinematics of the vehicle and the object (that is to say relative position, relative speed and relative acceleration) in both the longitudinal and the lateral direction, in which case, in addition to the object width, the maximum possible longitudinal and lateral acceleration is also additionally taken into account in order to assess the danger based on the braking danger value (BDV) and the steering danger value (SDV). The danger assessment according to the invention can be used in this case both for safety devices acting in the longitudinal direction, for example autonomous emergency braking (AEB) or autonomous emergency steering (AES), and for safety devices acting in the lateral direction (such as a device for avoiding a collision when changing lanes).

In order to explain the advantages achieved by the method according to the invention, exemplary temporal profiles of various variables which characterize the approach of the vehicle to an object with respect to a possibly imminent collision are plotted in FIGS. 4A-D. In this case, a relative speed of −70 kph (or −19.44 meters/second) between the vehicle and the object is taken as a basis only by way of example.

Specifically, FIG. 4A shows the temporal profile of the distance between the vehicle and the object (left-hand vertical axis) and the relative speed which is constant here (right-hand vertical axis), FIG. 4B shows the temporal profile of the braking danger value (BDV) determined according to the invention together with a comparison curve for a braking danger value determined according to the prior art labelled as BDV_PA, FIG. 4C shows the temporal profile of the steering danger value (SDV) determined according to the invention together with a comparison curve for a steering danger value determined according to the prior art labelled as SDV_PA, and FIG. 4D shows the respective remaining time to collision.

As is clear from FIG. 4B and FIG. 4C (and marked by the arrows "A" and "B"), in the exemplary embodiment, both the braking danger value (BDV) determined according to the invention and the steering danger value (SDV) determined according to the invention run linearly with time over a-distinctive periods of approximately 4 to 5 seconds before the respective last-chance braking-avoidance and steering-avoidance positions. Therefore the BDV and SDV are linearly time-dependent, that is each exhibits a constant or linear temporal rise, whereas the corresponding danger values according to the prior art (BDV_PA and SDV_PA) increase hyperbolically, with the result that, in the case of the danger values determined according to the prior art, a sharp rise in the danger values, which initially change only very slowly, takes place only immediately before the collision.

In contrast, the linear profile achieved according to the invention results in considerably better or more accurate predictability of the danger values and therefore also in more reliable adjustability of countermeasures, which need to be initiated in order to prevent or mitigate a collision, with regard to threshold values to be predefined for the danger values for this purpose. Furthermore, the relatively strong sensitivity in the prior art method to background noise in the sensor signal for the comparison curves of the braking and steering danger values is, in the inventive method disclosed herein, considerably reduced over time in the region of the sharp increase in the danger values in these comparison curves.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating an electronic controller to assess a collision risk between a vehicle and an object, comprising:
    determining, based on signals received from sensors detecting kinematics of the vehicle and of the object, a) a last-chance braking-avoidance position beyond which collision is unavoidable by braking the vehicle and b) a last-chance steering-avoidance position beyond which collision is unavoidable by steering the vehicle;
    determining a braking danger value (BDV) based on a current distance to the last-chance braking-avoidance position and a steering danger value (SDV) based on a current distance to the last-chance steering-avoidance position, at least one of the values expressing a probability of colliding with the object and being linearly time-dependent over a finite time period before reaching the respective last-chance braking-avoidance and last-chance steering-avoidance positions; and
    assessing the collision risk based on the BDV and the SDV.

2. The method of claim 1, wherein the step of assessing the collision risk comprises estimating when at least one of the BDV and the SDV will exceed a respective predefined threshold value.

3. The method of claim 1, further comprising: automatically initiating at least one countermeasure for avoiding or mitigating a collision based on the assessment of the collision risk.

4. The method of claim 3, wherein the automatic initiation of at least one countermeasure comprises generating a warning signal and/or automatically carrying out a steering and/or braking intervention.

5. A method of operating an electronic controller to assess a collision risk between a vehicle and an object, comprising:
    determining, based on signals received from sensors detecting kinematics of the vehicle and of the object, a) a last-chance braking-avoidance position beyond which collision is unavoidable by braking the vehicle and b) a last-chance steering-avoidance position beyond which collision is unavoidable by steering the vehicle;
    determining a braking danger value (BDV) based on a current distance to the last-chance braking-avoidance position, and a steering danger value (SDV) based on a current distance to the last-chance steering-avoidance position, wherein at least one of the BDV and the SDV expresses a probability of colliding with the object and is linearly time-dependent over a finite time period before reaching the respective last-chance braking-avoidance and last-chance steering-avoidance positions;

estimating when at least one of the BDV and the SDV will exceed a respective predefined threshold value; and automatically initiating at least one countermeasure for avoiding or mitigating a collision based on the estimating step.

6. The method of claim 5, wherein the automatic initiation of at least one countermeasure comprises generating a warning signal and/or automatically carrying out a steering and/or braking intervention.

7. A method of operating an electronic controller comprising:

determining a first value based on a distance of a vehicle to a last-chance braking-avoidance position and a second value based on a distance of the vehicle to a last-chance steering-avoidance position, the values expressing a collision probability and being linearly time-dependent over a finite time period before reaching the respective last-chance positions; and assessing a collision risk based on the first and second values.

8. The method of claim 7, wherein the step of assessing the collision risk comprises estimating when at least one of the first value and the second value will exceed a respective predefined threshold value.

9. The method of claim 7, further comprising: automatically initiating at least one countermeasure for avoiding or mitigating a collision based on the assessment of the collision risk.

10. The method of claim 9, wherein the automatic initiation of at least one countermeasure comprises generating a warning signal and/or automatically carrying out a steering and/or braking intervention.

* * * * *